E. WOODRUFF.
Kettle for Evaporating Sorghum, Sirup, &c.
No. 50,295.  Patented Oct. 3, 1865.
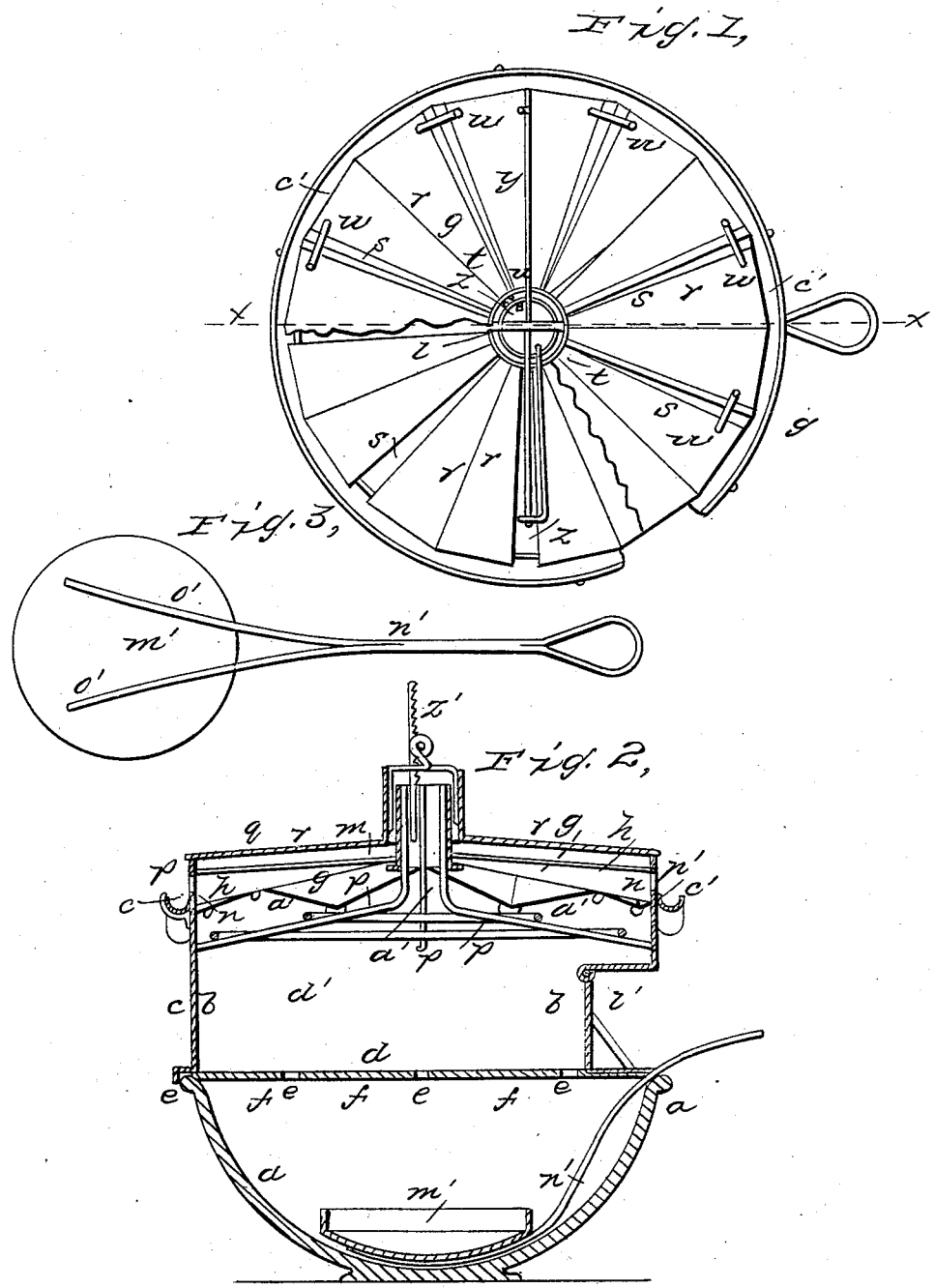

UNITED STATES PATENT OFFICE.

ELMER WOODRUFF, OF GRAND RAPIDS, MICHIGAN.

IMPROVED KETTLE FOR EVAPORATING SORGHUM-SIRUP, &c.

Specification forming part of Letters Patent No. 50,295, dated October 3, 1865.

*To all whom it may concern:*

Be it known that I, ELMER WOODRUFF, of Grand Rapids, in the county of Kent and State of Michigan, have invented a new and useful Improvement in Kettles and Covers Therefor; and I do hereby declare that the following is a full, clear, and exact description thereof, which will enable others skilled in the art to make and use the same, reference being had to the accompanying drawings, forming part of this specification.

The present invention relates more particularly to kettles, and covers for the same, especially adapted for the boiling or evaporation of salt, potash, saccharine substances, &c.

It is a well-known fact that in boiling salt, sugar, &c., in the kettles or boilers as now constructed or arranged, a large amount and a greater proportion of the steam, which is generated by the heat, as it descends therefrom, by coming in contact with the atmosphere becomes condensed and falls back into the kettle, thus necessarily requiring it to be again heated and evaporated, the expense of which is obvious, as well as the delay thereby occasioned in the process, it occupying much time and causing extra and unnecessary trouble.

To obviate these difficulties, while at the same time the steam, whether condensed or in the form of vapor, is allowed to freely escape from the vessel or kettle in which the salt, &c., is being boiled, is the principal object of my present improvements, they consisting in a novel construction of the top portion and sides of the cover placed upon the top and over the salt vessel or receptacle, whereby all the steam arising from the boiling liquid in the kettle, and condensed upon the interior surfaces or faces of said cover is caused to be conducted therefrom to the exterior of the vessel, while at the same time the free escape of such of the steam as does not condense is allowed, the advantages of which are obvious to all.

In addition to the above I have also made an improvement in a pan to be used in connection with a salt evaporating or boiling vessel or kettle, as will be presently described, the object of which is to prevent all possibility of the salt being injured by the heat from the fire-furnace to which it is subjected.

In accompanying plate of drawings, my improvements are illustrated, Figure 1 being a plan or top view; and Fig. 2 a central vertical section taken in the plane of the line $xx$, Fig. 1. Fig. 3 is a bottom view of the pan $m'$.

$a\,a$ in the drawings represent a kettle made of a round shape, and of cast-iron or any other suitable metal or material and size, in which kettle the salt, sugar, or other substance or material to be evaporated is placed together with a sufficient quantity of water or other requisite or suitable liquid; $b\,b$, its cover made of a corresponding round shape to that of the kettle, and placed upon and over the top edge of the same. This cover $b\,b$ is of peculiar construction, and consists of a straight or upright side piece, $c$, having upon and along its under edge, $d$, and either attached thereto or forming a part thereof, and at suitable distances from each other, a series of thin blocks or plates, $e\,e\,e$, leaving spaces or openings $f\,f\,f$ between the same, by which blocks the cover rests upon the kettle, the open spaces $f\,f\,f$ before referred to then serving as a communication between the vessel and the surrounding atmosphere, for a purpose to be presently specified.

The upper edge of the side plate of the cover is made of a triangular, serrated, or toothed shape, the teeth $a'\,a'$ being all of equal size for and throughout the whole of its circumference or length, to and upon which teeth the top plate, $g$, of the cover is secured, made in a series of similar sections or parts, $h\,h$, and placed at a slight outward incline from the common center tube, $l$, to which their inner ends, $m$, are secured, the outer ends, $n$, projecting a short distance over the edge of the side plate. Between each of these sectional pieces, commencing at the upper apex of each of the series of teeth composing the top edge of the side plate, $d$, is a narrow opening or space, $o$, extending the whole length of each section, the said sectional pieces constituting as a whole the top plate of the cover, being strengthened and braced by means of a series of wire rods, $p\,p$, properly arranged therefor upon the interior of the same, as plainly represented in Fig. 2.

At the lower angles formed by the junction of the inclined faces or edges of each of the teeth $a'\,a'$, and under the top-plate sections thereof, is an aperture or hole, $p'$, in the side plate, $c$.

Over the exterior surface of the top plate of the cover, formed in sections with an open space between each of the same, as described, is placed an additional top plate, $q$, made of similar sectional pieces, $r$ $r$, to those of the under top plate, but with their openings $s$ $s$ at and over the lower angles of junctions of the sections $h$ $h$, the inner ends, $t$, of these sections being secured to a concentric tube, $u$, upon and around the outside of the tube $l$, and their outer ends secured and held together and in position by rods $w$ $w$, extending across the opening spaces between them. This upper top plate is made entirely separate and distinct from the one below, and is so arranged, by means of a ratchet-handle, $y$, turning upon a fulcrum at $z$, and engaging with the teeth of a fixed rack-bar, $z'$, of the inner tube, that by raising or lowering the said ratchet-handle the outer top plate can be elevated from and depressed with regard to the inner top plate, according as it is desired to have a larger or smaller distance or space between them, it being held in its position by simply interlocking the ratchet-handle with the proper teeth of the rack-bar.

To and around the exterior of the side plate, $b$, and for nearly the whole extent or length of the same is attached or formed a gutter or grooved channel, $c'$.

The kettle or any other vessel suitable for evaporating or boiling salt, &c., having had previously a cover fitted to it, made of the form and constructed as above described, is first charged with the proper quantity of salt or other substance, such as sugar or potash, and with the requisite amount of water or other liquid suitable to be employed for boiling it in, when the cover is placed over the same and the kettle set on the stove, furnace, or other proper heating apparatus, and its contents thus subjected to the action of heat, which soon causes the generation of steam from the liquid. This steam as fast as generated passes upward into the chamber $d'$ of the cover, and impinging against the inner surfaces of the inclined sections of its top pieces, the greater portion of it is condensed and passes thereon through the series of apertures into the grooved channel or gutter upon the outside of the cover, from whence it flows into any suitable receptacle therefor. The remaining or uncondensed portion of the steam escapes through the narrow openings between the series of inclined sections of the top plate, and, impinging against the outer or secondary and similar top plate, is still further condensed, and conducted thereon also to the gutter, while the balance of steam, if any, escapes at the top and end openings thereof, as is evident without further explanation, the steam or vapor condensed upon the inner surface of the side plate of the cover as it passes upward from the kettle escaping through the open spaces surrounding its lower edge, and having an exterior guard-plate, $g'$, placed upon the outside of the same.

From the above explanation it is evident that a free exit of the steam or vapors generated in the boiling of salt, sugar, &c., is permitted from the vessel in which they are subjected to the action of heat, while at the same time any portion of such vapors which are condensed are conveyed out of the vessel, without coming in contact with the boiling liquid and substances below, the advantages of which are many and apparent to all conversant with the boiling of salt, sugar, &c. A short portion, $l'$, of the side plate of the cover is cut out and hinged at its upper edge to the top plate of the same, so as to be opened and closed at pleasure. Through this opening the pan $m'$, having a suitable-shaped handle, $n'$, attached to it, and with projecting lips, ridges, or legs $o$ $o'$ upon its under surface, is inserted in and removed from the kettle when necessary or desirable, the object and purpose of this pan being, when placed in and resting upon the bottom of the kettle or other boiler, to catch and retain the crystallized salt as it is thrown about and agitated by the ebullition of the water, and thus prevent it from lying upon the bottom of the vessel, where it would be in direct contact with the heated surface, which, as is well known, often destroys and injures it, the ridges on the under side of the pan sufficiently raising the pan to prevent any possibility of such a result occurring.

It may be here remarked, in conclusion, that by arranging a door in one side of the cover, as described, made of sufficient size to permit the passage of the salt-pan, it can be removed from or inserted in the boiler at any desired time, without in the least degree affecting the progress of the evaporation or boiling of the salt, &c., and without admitting any considerable amount of cold air thereto, the importance of which is obvious to all; and, in addition to the above, it may be here stated that, from the description and explanation of my cover for kettles used for boiling salt, sugar, &c., it can be made of compact form, with small expense, and is convenient for handling and manipulating.

I claim as new and desire to secure by Letters Patent—

1. A cover for kettles having the general construction and arrangement herein described, and for the purposes specified.

2. In combination with the above, the pan having supporting legs or ridges, substantially as and for the purpose specified.

3. Forming a door in the side of the cover of the kettle, through which the pan can be placed in or removed from the kettle, substantially as described.

ELMER WOODRUFF.

Witnesses:
ISAAC H. GORDON,
G. A. CLEMENT.